(12) United States Patent
Luo et al.

(10) Patent No.: US 10,796,725 B2
(45) Date of Patent: Oct. 6, 2020

(54) DEVICE, SYSTEM AND METHOD FOR DETERMINING INCIDENT OBJECTS IN SECONDARY VIDEO

(71) Applicant: MOTOROLA SOLUTIONS, INC., Chicago, IL (US)

(72) Inventors: Yang Luo, Chicago, IL (US); Paul F. Mafera, Winchester, MA (US); Daniel R. Bestor, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/181,861

(22) Filed: Nov. 6, 2018

(65) Prior Publication Data
US 2020/0143843 A1     May 7, 2020

(51) Int. Cl.
  *G11B 27/34*    (2006.01)
  *G06K 9/00*    (2006.01)
  *G11B 27/32*    (2006.01)

(52) U.S. Cl.
  CPC .......... *G11B 27/34* (2013.01); *G06K 9/00718* (2013.01); *G11B 27/32* (2013.01)

(58) Field of Classification Search
  CPC .............. G11B 27/34; G06K 9/00718
  See application file for complete search history.

(56) References Cited

U.S. PATENT DOCUMENTS

| | | | |
|---|---|---|---|
| 9,336,675 B2 | 5/2016 | Miller et al. | |
| 9,396,397 B2 | 7/2016 | Sabripour et al. | |
| 2002/0094135 A1 | 7/2002 | Caspi et al. | |
| 2004/0220965 A1 | 11/2004 | Harville et al. | |
| 2012/0251011 A1* | 10/2012 | Gao | G06F 16/58 382/224 |
| 2014/0324845 A1 | 10/2014 | Bronstein et al. | |
| 2015/0139608 A1 | 5/2015 | Theobalt et al. | |
| 2017/0013203 A1* | 1/2017 | Hazzani | G08B 13/19608 |
| 2018/0189600 A1* | 7/2018 | Astrom | G06K 9/6202 |
| 2018/0247135 A1* | 8/2018 | Oami | G06T 7/20 |

* cited by examiner

*Primary Examiner* — Girumsew Wendmagegn
(74) *Attorney, Agent, or Firm* — Perry + Currier, Inc.

(57) ABSTRACT

A device, system and method for determining incident objects in secondary video is provided. An electronic device: plays, at a display screen, a primary video from a primary video source located at a primary location; determines an incident type associated with the primary video; determines incident object(s) associated with the incident type; detects a particular incident object in a secondary video from a secondary video source located at a secondary location within a threshold distance of the primary location, the particular incident object appearing in the secondary video within a threshold time period from a current playback time of the primary video; determines a relative direction of a location of the particular incident object from the primary location; and controls the display screen to render a particular visual indicator of the particular incident object over or adjacent the primary video at a position indicative of the relative direction.

16 Claims, 5 Drawing Sheets

DEVICE, SYSTEM AND METHOD FOR DETERMINING INCIDENT OBJECTS IN SECONDARY VIDEO

BACKGROUND OF THE INVENTION

Public safety personnel, such as police officers, often wear body cameras that collect and upload video to a central public safety database. Similarly, fixed closed circuit cameras are being increasingly deployed, which also collect and upload video to a central public safety database. When public safety incidents occur, evidence of such public safety incidents may be determined from live-streamed video and/or from video uploaded and stored to the public safety database, but sorting through such video can be a time-consuming and/or technically inefficient process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Another aspect of the specification provides a method comprising: playing, using a controller of an electronic device, at a display screen, a primary video from a primary video source located at a primary location; determining, using the controller, an incident type associated with the primary video; determining, using the controller, one or more incident objects associated with the incident type; detecting, using the controller, a particular incident object, of the one or more incident objects, in a secondary video from a secondary video source located at a secondary location within a threshold distance of the primary location, the particular incident object appearing in the secondary video within a threshold time period from a current playback time of the primary video; determining, using the controller, a relative direction of a location of the particular incident object from the primary location; and controlling, using the controller, the display screen to render a particular visual indicator of the particular incident object over or adjacent the primary video at a position indicative of the relative direction.

Another aspect of the specification provides an electronic comprising: a controller in communication with a display screen, the controller configured to: play, at the display screen, a primary video from a primary video source located at a primary location; determine an incident type associated with the primary video; determine one or more incident objects associated with the incident type; detect a particular incident object, of the one or more incident objects, in a secondary video from a secondary video source located at a secondary location within a threshold distance of the primary location, the particular incident object appearing in the secondary video within a threshold time period from a current playback time of the primary video; determine a relative direction of a location of the particular incident object from the primary location; and control the display screen to render a particular visual indicator of the particular incident object over or adjacent the primary video at a position indicative of the relative direction.

Figure 1:
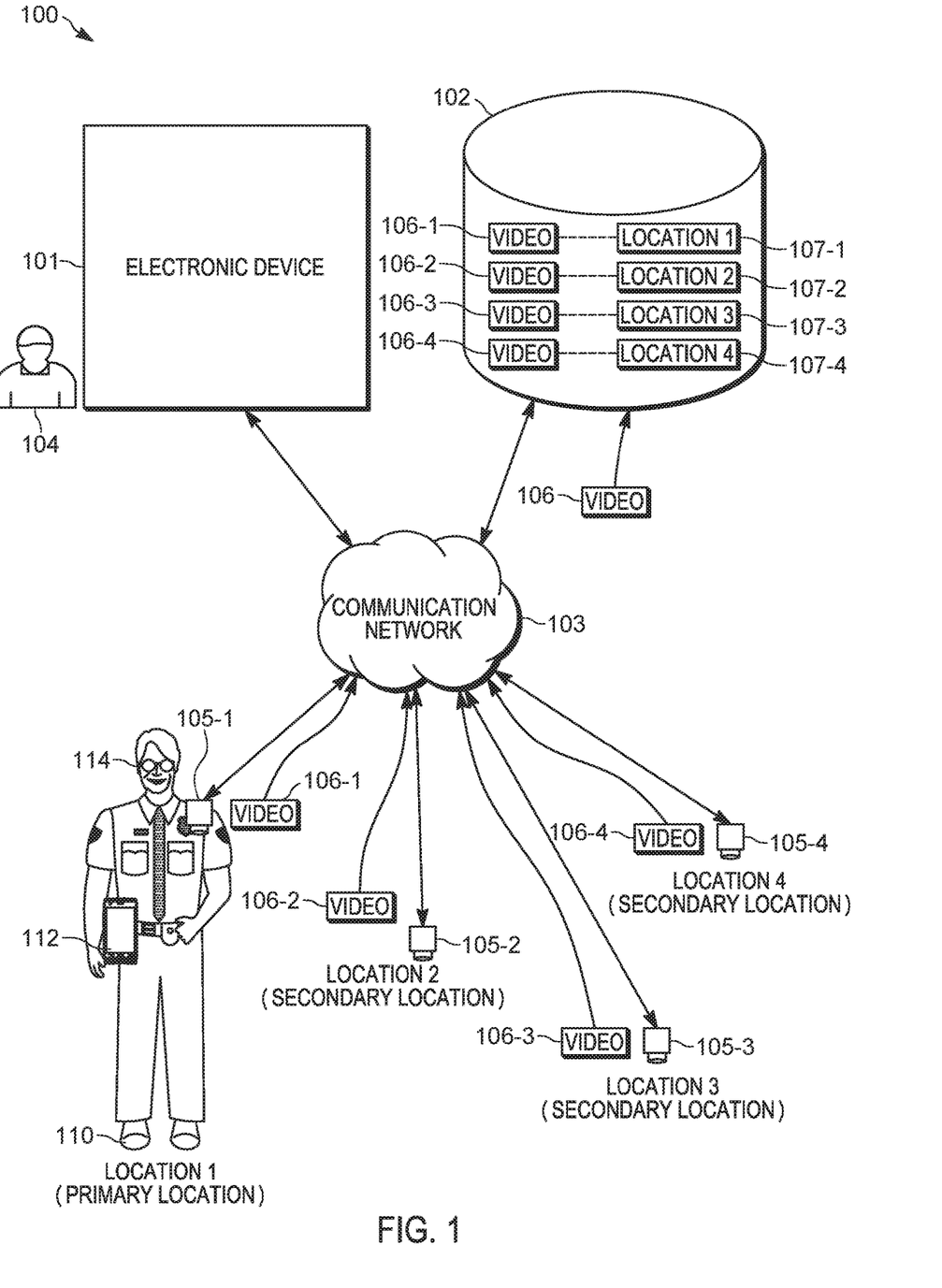
FIG. 1 is a system for determining incident objects in secondary video, in accordance with some examples.

Attention is directed to FIG. 1, which depicts an example system 100 for determining incident objects in secondary video. The system 100 comprises an electronic device 101 for determining incident objects in secondary video. As depicted, the electronic device 101 (interchangeably referred to hereafter as the device 101) is in communication with a database 102 via a communication network 103 (interchangeably referred to hereafter as the network 103), such as the Internet, a cell network and/or a public safety communication network, and the like. For example, each of the device 101 and the database 102 may be in communication with the network 103 via respective wired or wireless communication links, as desired, depicted in FIG. 1 as double-ended arrows between the network 103 and respective components of the system 100. However, the device 101 and the database 102 may be co-located and in communication via a local network and/or the device 101 may comprise the database 102 (e.g. the database 102 may be a memory of the device 101). Indeed, a person of skill in the art understands that the database 102 is generally a component of a computing device and/or communication device that provides communications at the database 102 with the network 103 and/or the device 101.

Each of the device 101 and the database 102 may be associated with, and/or maintained by, a public safety entity, such as a police department and the like. However, each of the device 101 and the database 102 may be associated with, and/or maintained by a commercial entity (e.g. non-public safety entities) and the like. As depicted, a user 104 may be locally operating the device 101, for example via an input device and a display screen of the device 101; however, the user 104 may be remote from the device 101 and operating the device 101 via a remote terminal in communication with the device 101, the remote terminal including an input device and a display screen. The user 104 may be associated with, and/or an employee of, the entity associated with the device 101 and/or the database 102.

The system further comprises a plurality of video sources 105-1, 105-2, 105-3, 105-4, interchangeably referred to hereafter, collectively, as the video sources 105 and, generically, as a video source 105. The video sources 105 are each in communication with the database 102 and/or the device 101 via the network 103. Furthermore, each of the video sources 105 are generally located at a respective location (e.g. the video source 105-1 is located at "Location 1", which, as depicted, may be designated as a primary location; and the video sources 105-2, 105-3, 105-4 are respectively located at "Location 2", "Location 3", "Location 4", each of which, as depicted, may be designated as a secondary location).

Each of the video sources 105 generally produce respective videos 106-1, 106-2, 106-3, 106-3 (interchangeably referred to hereafter, collectively, as the videos 106 and, generically, as a video 106) that are uploaded by the video sources 105 to the database 102 (for example via the network 103), and stored at the database 102. Alternatively, one or more of the video sources 105 may stream video 106 directly or indirectly to the device 101 (e.g. as a live-stream video). One or more of the videos 106 may include audio, however, one or more of the videos 106 may not include audio.

Each of the videos 106 generally comprise video captured at each of the respective locations of the video sources 105. While not depicted, each of the videos 106 are generally timestamped such that playback times between the videos 106 may be determined, for example by the device 101. Furthermore, each of the videos 106 may be stored at the database 102 in association with data indicating a respective location 107-1, 107-2, 107-3, 107-4 at which respective video 106 was captured. For example, the video 106-1 was captured at the location 107-1 (e.g. "Location 1"), etc. The data indicative of the locations 107-1, 107-2, 107-3, 107-4 will be interchangeably referred to hereafter, collectively, as the locations 107 and, generically, as a location 107. Associations between data stored at the database 102 are generally indicated via dashed lines therebetween.

Each of the video sources 105 may be mobile or fixed. When a video source 105 is mobile, a location 107 at which a respective video 106 is captured may be uploaded to the database 102 with the data indicative of a respective location or locations 107 (e.g. using Global Positioning System (GPS) coordinates and the like). When a video source 105 is fixed, a location 107 at which a respective video 106 is captured may be uploaded to the database 102 with the data indicative of the respective location 107 and/or the database 102 may be preconfigured with the respective location 107. The database 102 may further comprise other types of data associated with the video sources 105 including, but not limited to, identifiers of the video sources 105 (e.g. Media Access Control (MAC) addresses, Internet Protocol (IP) addresses, and the like), identifiers of users operating the video sources (e.g. a name, an employee number, a badge number, and the like), fields of view, orientation, imaging parameters, etc.

In yet further examples, the database 102, and/or another database, may store a computer-aided-dispatch record associated with the user 104 and/or an incident and/or users of the video sources 105, and the like. Such computer-aided-dispatch records may be generated by a computer-aided-dispatch device of the system 100 and/or the device 101 (e.g. the device 101 may comprise a computer-aided-dispatch device of a public service entity). A computer-aided-dispatch record may include information about an incident to which a public service officer is dispatched, including, but not limited to, an incident type, a location of the incident, vehicles or incident objects of interest relative to the incident, a suspect in the incident, and the like.

Each of the video sources 105 generally comprise a video camera, and the like, which may be fixed or mobile. For example, as depicted, the video source 105-1 comprises a mobile body-worn camera worn by a user 110, depicted in FIG. 1 as a public safety officer and/or police officer. However, the user 110 may not be a public safety officer and/or police officer; for example, the user 110 may be an employee of an entity operating the device 101 and/or the database 102. As depicted in FIG. 1, the user 110 is further wearing a mobile communication device 112 and smart glasses 114, each of which may also comprise a respective video camera and hence may also be a video source.

In some examples, the video source 105-1 may be a stand-alone video source and/or body-worn camera, or integrated with a remote speaker microphone and/or another device worn by the user 110.

In some examples, the video source 105-1, the mobile communication device 112 and the smart glasses 114 may form a personal area network (PAN), with the mobile communication device 112 acting as a hub of the PAN, with the video source 105-1 (and/or the smart glasses 114) uploading video to the database 102 via the mobile communication device 112. However, as depicted, the video source 105-1 is uploading the video 106-1 to the database 102 directly.

One or more of the secondary video sources 105-2, 105-3, 105-4 may also be mobile (e.g. worn by other users and/or police officers, and the like) and/or one or more of the secondary video sources 105-2, 105-3, 105-4 may be fixed. For example one or more of the secondary video sources 105-2, 105-3, 105-4 may comprise a closed circuit video camera associated with, and/or maintained by, the entity associated with device 101 and/or the database 102. However, one or more of the secondary video sources 105-2, 105-3, 105-4 may comprise a closed circuit video camera associated with, and/or maintained by, an entity different from the entity associated with device 101 and/or the database 102; in these examples the entity operating the secondary video sources 105-2, 105-3, 105-4 have provided access (under an agreement and/or license) to the secondary video sources 105-2, 105-3, 105-4 by the device 101 and/or the database 102.

Furthermore, while four video sources 105 are depicted, the system 100 may comprise as few as two video sources 105, and/or tens to hundreds, or more, video sources 105, for example depending on a number of users 110 (e.g. public safety officers) deployed and/or a number of closed circuit video cameras, and the like, deployed in the system 100. Furthermore, all of the video sources 105 may be mobile, or all of the video sources 105 may be fixed, or the video sources 105 may comprise a combination of mobile and fixed video sources 105.

Figure 2:
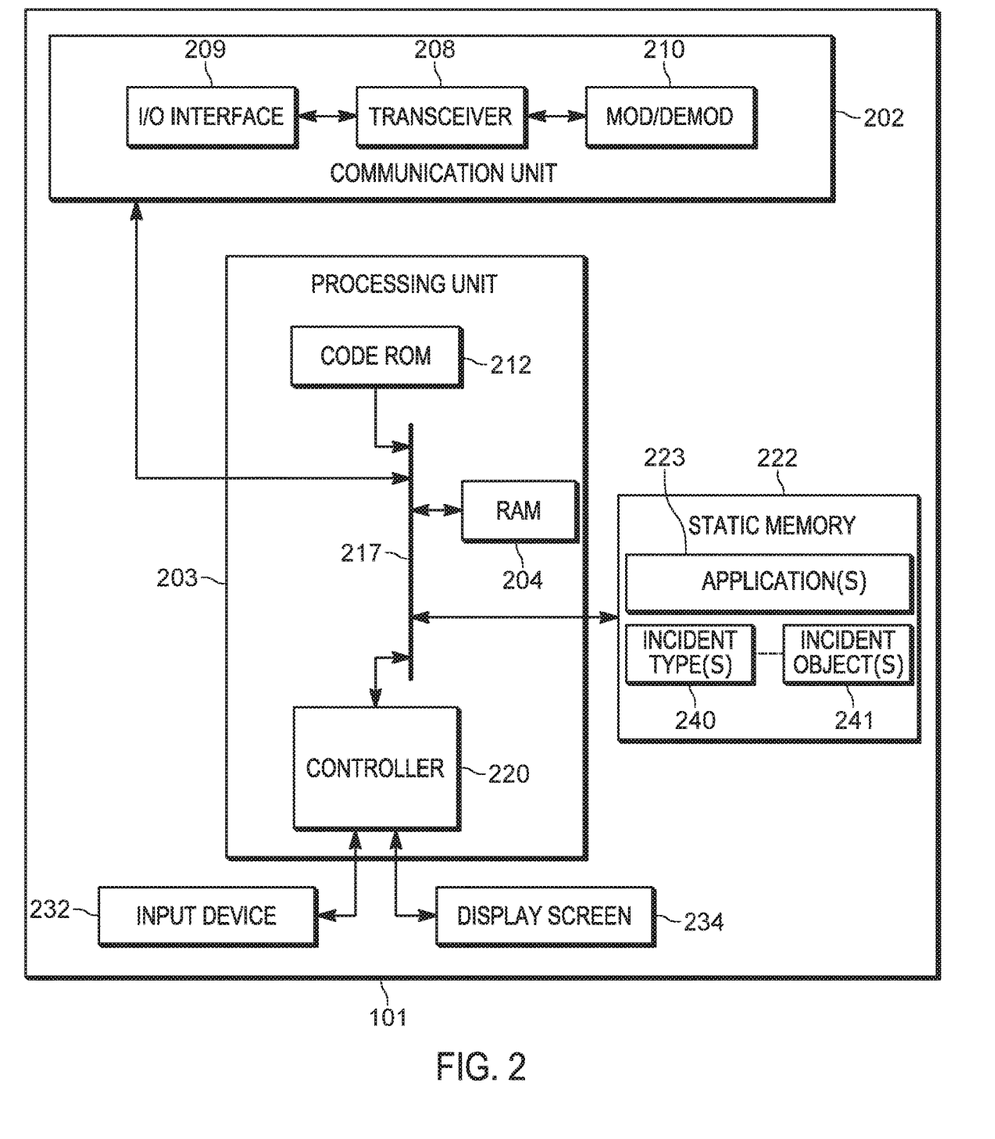
FIG. 2 is a device diagram showing a device structure of an electronic device for determining incident objects in secondary video, in accordance with some examples.

Attention is next directed to FIG. 2, which depicts a schematic block diagram of an example of the device 101.

In general, the device 101 may comprise a server and/or cloud-based computing device comprising: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing at least one application 223, an input device 232 and a display screen 234. Hereafter, the at least one application 223 will be interchangeably referred to as the application 223. Furthermore, each of the memories 212, 222 comprise non-transitory memories and/or non-transitory computer readable mediums. In some examples, memory 222 comprises the database 102.

As shown in FIG. 2, the device 101 includes the communications unit 202 coupled to the common data and address bus 217 of the processing unit 203.

The input device 232 may comprise one or more of a keypad, pointing device, touch-sensitive surface (e.g. at the display screen 234), and the like, and the display screen 234 may comprise a flat panel display, and the like, which, in some examples, may include a touch screen and/or a touch-sensitive surface of the input device 232. Hence, the display screen 234 may also act as an input device. Each of the input device 232 and the display screen 234 is in communication with the processing unit 203 and/or the controller 220. While not depicted, the device 101 may also include one or more of a speaker and a microphone used for interactions with the device 101.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with other communication devices. For example, the communication unit 202 may include one or more transceivers 208 and/or wireless transceivers for communicating with the database 102 and/or the video sources 105. Hence, the one or more transceivers 208 may be adapted for communication with the network 103. For example, the network 103 may comprise one or more of a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. the input device 232, the display screen 234, and the like). Indeed, the input device 232 and/or the display screen 234 may be located external to the device 101 and in communication with the device 101 via such ports. Alternatively, the input device 232 and/or the display screen 234 may be located remote from the device 101 (e.g. at a terminal operated by the user 104) and in communication with the device 101 via the communication unit 202 and/or the network 103.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for determining incident objects in secondary video. For example, in some examples, the device 101 and/or the controller 220 specifically comprises a computer executable engine configured to implement functionality for determining incident objects in secondary video.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220, which makes appropriate utilization of volatile storage during the execution of such programming instructions.

Figure 3:
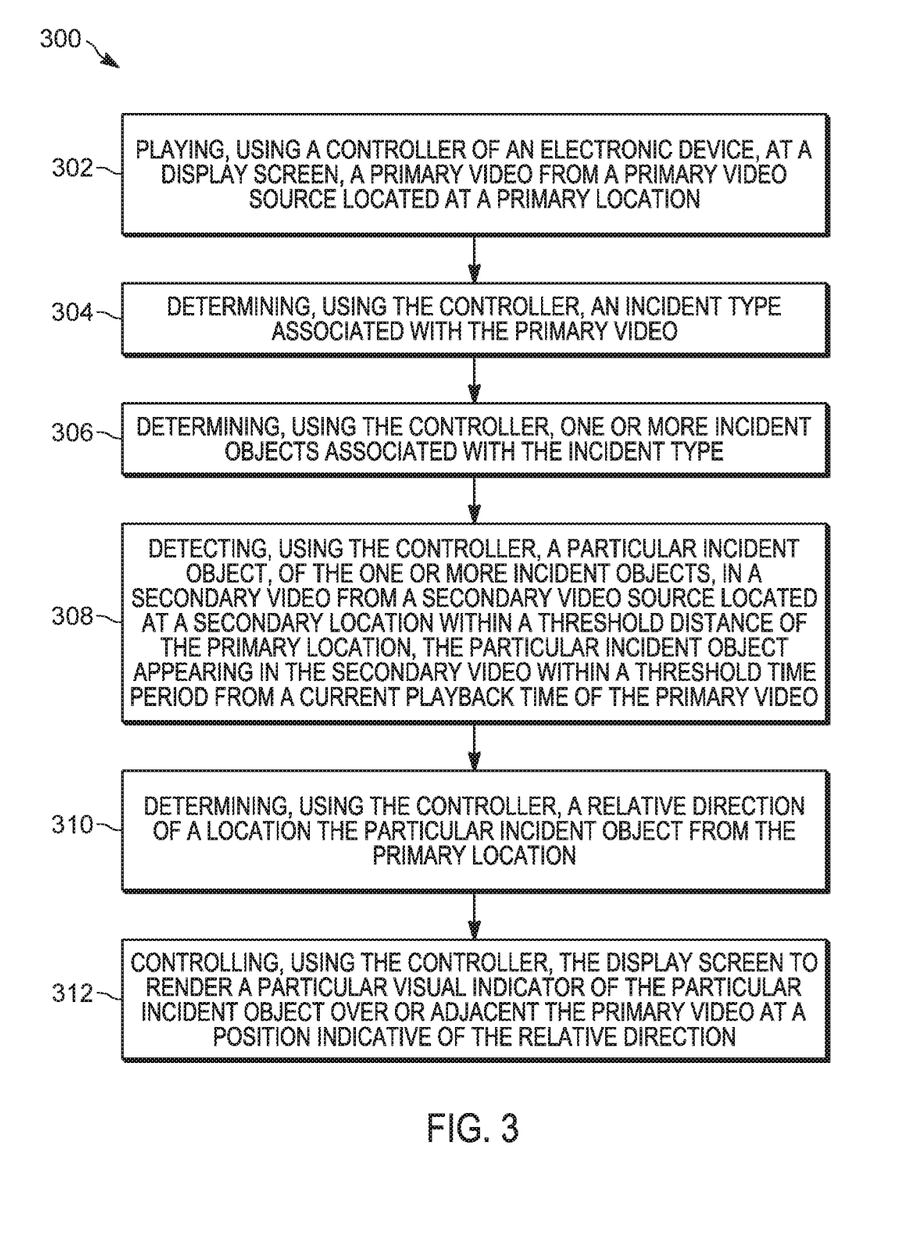
FIG. 3 is a flowchart of a method for determining incident objects in secondary video, in accordance with some examples.

In particular, the memory 222 stores instructions corresponding to the at least one application 223 that, when executed by the controller 220, enables the controller 220 to implement functionality for determining incident objects in secondary video including, but not limited to, the blocks of the method set forth in FIG. 3. In illustrated examples, when the controller 220 executes the one or more applications 223, the controller 220 is enabled to: play at the display screen 234, a primary video 106 from a primary video source 105 located at a primary location 107; determine an incident type associated with the primary video 106; determine one or more incident objects associated with the incident type; detect a particular incident object, of the one or more incident objects, in a secondary video 106 from a secondary video source 105 located at a secondary location 107 within a threshold distance of the primary location 107, the particular incident object appearing in the secondary video 106 within a threshold time period from a current playback time of the primary video 106; determine a relative direction of a location of the particular incident object from the primary location 107; and control the display screen 234 to render a particular visual indicator of the particular incident object over or adjacent the primary video 106 at a position indicative of the relative direction.

For example, as also depicted in FIG. 2, the memory 222 may further store one or more incident types 240 each stored in association with a respective list of one or more incident objects 241 associated with the incident type. For example, an incident type of "Robbery" may be stored in association of a list of incident objects that may include, but is not limited to, a "Gun", a "Knife", a "Ski Mask", and the like. Furthermore, such a list of incident objects may include specific suspects, witnesses, employees, or other persons populated, for example, from an incident report associated with a given incident; in some of these examples, an image of the suspect may be retrieved (e.g. using a name of the suspect) from a social media site. For example, an image of a suspect retrieved may include one or more of a suspect's face, a suspect's tattoos and/or scars and/or other identifying characteristics, and/or any other visual information that may be used to uniquely identify a person and/or suspect in a video. In some examples, such identifying information may include, but is not limited to, audio reproduction of their names in a video or audio recording.

However, incident of the incident type 240 need not be a criminal incident; for example, the incident of the incident type 240 be live event such as a concert, a sports competition, and the like, and the incident type 240 may correspondingly be a "Concert" a type of concert (e.g. "Rock Concert"), a type of sporting event (e.g. a Karate Competition", a "Baseball Game" and the like). Similarly, list of one or more incident objects 241, may include incident objects associated with live-events (e.g., "Nun-chucks" may be associated with a "Karate Competition" and/or "Bottle" may be associated with a "Rock Concert").

While only one incident type 240 and one list of incident objects 241 is depicted, a person of skill in the art understands that the memory 222 may store a plurality of incident types 240 each stored in association with a list of one or more incident objects 241 associated with an incident type. Furthermore, the incident type 240 and the incident objects 241 may be preconfigured at the memory 222 and/or stored at the database 102 and/or predetermined by an administrator of the system 100 and/or determined using machine learning algorithms, and the like.

Indeed, the application 223 may include machine learning and/or deep-learning based algorithms, and the like, which have been trained and/or configured to detect a particular incident object, of one or more incident objects, in a video and/or determine a relative direction of a location of the particular incident object from a primary location. Such machine learning and/or deep-learning based algorithms may further have been trained and/or configured to update the incident objects 241 associated with incident types 240 and/or determine the incident objects 241 associated with incident types 240. Indeed, such training may occur by implementing the application 223 and providing feedback to the application 223 based on past implementations of the application 223. Furthermore, the application 223 may initially be operated by the controller 220 in a training mode to train the application 223 detect a particular incident object, of one or more incident objects, in a video and/or determine a relative direction of a location of the particular incident object from a primary location and/or determine incident objects associated with given incident types.

The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm and/or deep learning algorithm is within the scope of present examples.

Furthermore, the application 223 may include, but are not limited to, algorithms for one or more of: video analytics algorithms, object-matching analytics algorithms, action-matching analytics algorithms, two-dimensional image matching, three-dimensional model matching, and the like. Indeed, the application 233 may include any suitable algorithm to determine the incident objects 241 associated with incident types 240 in images and/or videos including, but not limited to, algorithms that use descriptions (e.g. textual descriptions, and the like) of incident objects to search for corresponding incident objects in images and/or videos, and the like.

While details of the video sources 105 are not depicted, each of the video sources 105 may have components similar to the device 101 adapted, however, for the functionality of the video sources 105; for example, each video source 105 may have a communication unit, controller and the like adapted to receive and transmit video 106, from a respective video camera of each video source 105, to the database 102 and/or the device 101. However, a video source 105 may not include a display screen and/or a video source 105 may not include an input device (other than to operate the video source 105), and/or an application stored at a memory of a video source 105 is generally adapted to provide the functionality of the video source 105 when implemented by a respective controller.

Attention is now directed to FIG. 3, which depicts a flowchart representative of a method 300 for determining incident objects in secondary video. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

In the present example of FIG. 3, the video 106-1 will be designated as the primary video 106-1 and the video 106-2 will be designated as a secondary video 106-2. Hence, the video source 105-1 and the location 107-1 will be designated, respectively, as the primary video source 105-1 and the primary location 107-1, and the video source 105-2 and the location 107-2 will be designated, respectively, as the secondary video source 105-2 and the secondary location 107-2.

At a block 302, the controller 220 plays at the display screen 234, a primary video 106-1 from a primary video source 105-1 located at a primary location 107-1. For example, the user 104 may interact with the input device 232 and the display screen 234 to select the video 106-1 from the database 102 (e.g. via a graphic user interface, and the like as a primary video, and hence the controller 220 may responsively play, at the display screen 234, the selected video 106-1 as the primary video 106-1. In other examples, the user 104 may interact with the input device 232 and the display screen 234 to select the video 106-1 from a list of live-stream videos, and the like.

When the video 106-1 is selected as a primary video 106-1, the corresponding location 107-1 is designated as a primary location 107-1, and the other videos 106-2, 106-3, 106-4 and locations 107-2, 107-3, 107-4 are designated as secondary videos 106 and secondary locations 107. However, while in FIG. 1, the location 107-1 (e.g. "Location 1") of the video source 105-1 is designated as a primary location (e.g. the video source 106-1 is selected as a primary video 106), and the other locations 107 are designated as secondary locations, any of the videos 106 and/or locations 107 may be selected as primary videos and/or primary locations.

Furthermore, in some examples, both the primary video 106-1 and a secondary video 106 (e.g. the video 106-2) may be provided and/or played and/or rendered at the display screen 234. For example, the primary video 106-1 may be rendered at the display screen 234 in a primary position and the secondary video 106-2 may be rendered at the display screen 234 in a secondary position, the secondary video 106-2 having a smaller form factor at the display screen 234 in the secondary position, relative to the primary video 106-1 in the primary position. In some of these examples, a plurality of secondary videos 106 may be rendered in respective secondary positions at the display screen 234. Furthermore, one or more of the plurality of secondary videos 106 may be rendered in a time-synchronized manner with the primary video 106-1 (e.g. one or more of the plurality of secondary videos 106 may be rendered at playback times synchronized with a current playback time of the primary video 106-1. For example, the secondary video 106-2 may be rendered at the display screen 234 time-synchronized with the primary video 106-1.

However, in other examples, the secondary video 160-2 and/or other secondary videos 106 may not be rendered at the display screen 234.

At a block 304, the controller 220 determines an incident type associated with the primary video 106-1. For example, in some examples, the controller 220 may determine an incident type by applying video analytics (and/or (object-matching analytics algorithms, and/or action-matching analytics algorithms, and the like) to the primary video 106-1 to determine an incident type, using machine learning algorithms, and the like, as described above, the machine learning algorithms trained to recognize incident types form video. Indeed, the block 304 may include applying one or more machine learning algorithms to the primary video 106-1 to determine an incident type.

In other examples, the controller 220 may determine an incident type by receiving input from the input device 232 (e.g. in communication with the controller 220), the input indicative of the incident type. In particular, the user 104 may operate the input device 232 to enter an incident type associated with the primary video 106-1 at its primary position at the device 101.

In other examples, the controller 220 may determine an incident type by retrieving the incident type from a computer-aided-dispatch record associated with one or more the user 104 of the electronic device 101 and the primary video 106-1. For example, the device 101 may have access to a computer-aided-dispatch record (linked to, and/or associated with, the primary video 106-1) that includes an incident type and/or the user 104 may be assigned to perform analysis on an incident associated with a computer-aided-dispatch record, which may also be associated with a video 106 in the database 102 (e.g. the primary video 106-1). In still other examples, the incident type may be embedded within the primary video 106-1 itself and/or within metadata of the primary video 106-1.

At a block 306, the controller 220 determines one or more incident objects associated with the incident type. For example, the controller 220 may determine the one or more incident objects from the list of one or more incident objects 241 associated with an incident type 240 that matches the incident type determined at the block 304.

At a block 308, the controller 220 detects a particular incident object, of the one or more incident objects 241, in a secondary video 106-2 from a secondary video source 105-2 located at a secondary location 107-2 within a threshold distance of the primary location 107-1, the particular incident object appearing in the secondary video 106-2 within a threshold time period from a current playback time of the primary video 106-1. The threshold distance and/or the threshold time period may be predetermined and/or received as input at the input device 232. A respective default threshold distance and/or a respective default threshold time period may also be associated with an incident type 240 stored in the memory 222. Such predetermined and/or default threshold distances and/or time periods may be adjustable via the input device 232. As just some examples, the default threshold distance may be in the range of 500 feet to 5 miles, or in the range of 500 feet to 2,500 feet, or in the range of 500 feet to 1000 feet. And as just some further examples, the default threshold time period could be in the range of 0.01 seconds to 100 seconds, or in the range of 0.5 seconds to 10 seconds, or in the range of 0.5 seconds to 5 seconds. However, any suitable default threshold distance and default threshold time period is within the scope of the present specification.

Furthermore, while the present example is described with respect to one particular incident object and one secondary video 106-2, the block 308 may include the controller 220 detecting more than one particular incident object, of the one or more incident objects 241, in one secondary videos 106, or more than one secondary videos 106 from respective secondary video sources 105 located at respective secondary locations 107, each within a threshold distance of the primary location 107-1.

Furthermore, in some examples, the particular incident object never appears in the primary video 106-1. Hence, for example, the primary video 106-1 may be associated with an incident type, such as a robbery (e.g. the primary video 106-1 includes video of the location 107-1 at which a robbery occurred), but the primary video 106-1 may not include any of the incident objects 241 associated with a robbery; rather, the controller 220 may detect such incident objects 241 in one or more secondary videos 106.

Hence, for example, the controller 220 may determine the list of incident objects 241 associated with the incident type 240 determined at the block 304 and search for those incident objects 241 in all the secondary videos 106 that were acquired at locations 107 within a threshold distance from the primary location 107-1 (e.g. 50 feet, and the like), and within a threshold time period (for example plus and minus 30 seconds, and the like, from a current playback time of the primary video 106-1). However, any suitable threshold distance and suitable threshold time period is within the scope of the preset specification.

Furthermore, in some examples, the secondary video 106-2 (and/or more than one secondary video 106) may be processed and/or analyzed in response to identifying the incident type of the primary video 106-1 (and/or in response to determining the one or more incident objects 241 associated with the incident type 240), for example to detect the one or more incident objects 241 in the secondary video 106-2 at the block 308. However, in other examples, the secondary video 106-2 (and/or more than one secondary video 106) may be preprocessed (e.g. before the block 308 and/or before the method 300 is implemented) to determine and/or extract pre-populated lists of incident objects; in these examples, the block 308 may include detecting the one or more incident objects 241 in the secondary video 106-2 (and/or more than one secondary video 106) using a pre-populated list of incident objects for the secondary video 106-2 (and/or more than one secondary video 106).

At a block 310, the controller 220 determines a relative direction of a location of the particular incident object from the primary location 107-1. For example, the controller 220 may identify a location of the particular incident object from the secondary video 106-2 in which the particular incident object has been detected, and compare the location of the particular incident object to the primary location 107-1. Identifying the location of the particular incident object from the secondary video 106-2 may occur using machine learning algorithms, and the like.

In some examples, the controller 220 may determine a relative direction of a location of the particular incident object using a location (e.g. the location 107-2) of the secondary video source 105-2 (e.g. that acquired the secondary video 106-2) as a proxy for the location of the particular incident. object.

In yet further examples, the controller 220 may determines a relative direction of a location of the particular incident object using video analytics, and the like, to determine a location of the particular incident object as offset from the location (e.g. the location 107-2) of the secondary video source 105-2 (e.g. that acquired the secondary video 106-2). For example, the controller 220 may start with the location 107-2 of the secondary video source 105-2 that acquired the secondary video 106-2 and determine an offset of the particular incident object using video analytics; the offset may be added to (or subtracted from, and the like), from the location 107-2 to determine the location of the particular incident object.

At a block 312, the controller 220 controls the display screen 234 to render a particular visual indicator of the particular incident object over or adjacent the primary video 106-1 at a position indicative of the relative direction. Hence, for example, when the particular incident object is a gun, the controller 220 may render an image and/or icon of a gun at an edge of the primary video 106-1 (e.g. either over and/or on the primary video 106-1 at the display screen 234, or beside and/or adjacent the primary video 106-1 at the display screen 234, for example in the graphic user interface) that corresponds to a relative direction in which the gun was located in the secondary video 106-2. In other examples, the particular visual indicator may include, but is not limited to, a generic shape and/or color and include text describing the particular incident object (e.g., a "gun"). Indeed, any suitable particular visual indicator is within the scope of the present specification.

Furthermore, in some examples, while playing the primary video 106-1 at the display screen 234, the controller 220 may: track movement of the particular incident object in the secondary video 106-2 as a function of time of the secondary video 106-2 synchronized with the playing of the primary video 106-1; and modify the position of the particular visual indicator in the primary video 106-1 with the movement of the particular incident object in the secondary video 106-2. Hence, returning to the example of the particular incident object being a gun and the particular visual indicator comprising an icon of a gun, as the primary video 106-1 plays, the icon of the gun will move when the gun detected in the secondary video 106-2 moves in the secondary video 106-2 as a function of time as synchronized with the primary video 106-1.

Similarly, the controller 220, while playing the primary video 106-1 at the display screen 234, may: determine, at a time synchronized with the playing of the primary video 106-1, that the particular incident object no longer appears in the secondary video 106-2; and responsively remove the particular visual indicator from over or adjacent the primary video 106-1. Hence, for example, at a time that the gun no longer is detected in the secondary video 106-2, the gun icon is removed from the primary video 106-1.

Furthermore, when more than one particular incident object has been detected in one or more secondary videos 106-2, particular visual indicators for each of the particular incident object may be rendered over or adjacent the primary video 106-1 at respective positions indicative of respective relative directions. Each of the particular visual indicators may move with a respective particular incident objects in the one or more secondary videos 106-2, and each of the particular visual indicators may be removed from the primary video 106-1 as the respective particular incident objects no longer appear in in the one or more secondary videos 106-2.

In some examples, the particular visual indicator may be used to control the positions of the primary video 106-1 and the secondary video 106-2 at the display screen 234. For example, responsive to detecting an input activation of the particular visual indicator (e.g. via the input device 232), the controller 220 may replace the primary video 106-1 at the display screen 234 with the secondary video 106-2, at a second playback time substantially synchronized with the current playback time of the primary video 106-1 at which the input activation was received. For example, the secondary video 106-2 may replace the primary video 106-1 at the primary position at the display screen 234 and/or be moved from a secondary position to the primary position. In some of these examples, the primary video 106-1 may be rendered at the secondary position (e.g. the positions of the primary video 106-1 and the secondary video 106-2 are swapped; in some of these examples, the primary video 106-1 and the secondary video 106-2 may remain time-synchronized at a current playback time at a time of detecting the input activation).

Furthermore, the secondary video 106-2 may be rendered, now at the primary position, at the current playback time of the primary video 106-1 when the particular visual indicator was activated.

In some examples, once the secondary video 106-2 is rendered at the primary position, the controller 220 controls the display screen 234 to render a second particular visual indicator over or adjacent the secondary video 106-2 at a respective position indicative of the primary location 107-1 of the primary video source 105-1 relative to the secondary location 107-2. For example, the controller 220 may compare the locations 107-1, 107-2 to determine a relative location of the primary video source 105-1 to the secondary video source 105-2.

The second particular visual indicator may be for returning the primary video 106-2 to the primary position at the display screen 234 and may take the form of a back arrow and/or a geometric shape with the text phrase "back" (and the like) contained therein, among other possibilities. Hence, in some examples, responsive to detecting a respective input activation of the second particular visual indicator, the controller 220 may replace the secondary video 106-2 at the primary position of the display screen 234 with the primary video 106-1, at a third respective playback time substantially synchronized with the second playback time of the secondary video 106-2 at which the respective input activation was received.

For example, once the secondary video 106-2 is rendered at the primary position, the secondary video 106-2 may play (and/or continue to play and/or the user 104 may adjust the playback time of the secondary video 106-2). Hence, when the second particular visual indicator is activated via the respective second input activation (e.g. using the input device 232), the primary video 106-1 replaces the secondary video 106-2 at the primary position at the same playback time that the secondary video 106-2 was at, when the second particular visual indicator was activated.

Figure 4:
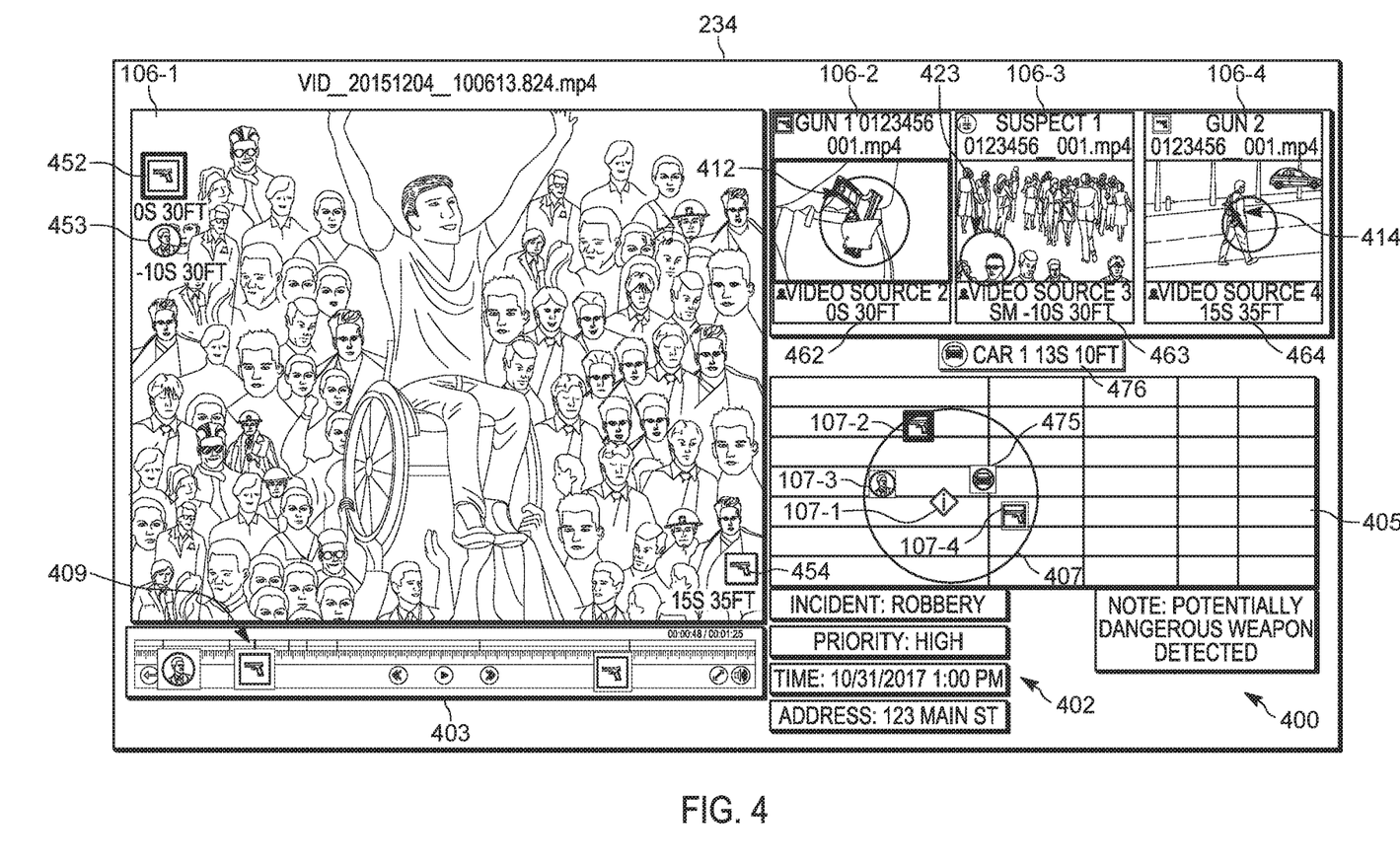
FIG. 4 depicts a graphic user interface at a display screen of the device of FIG. 2, to show an example of a method for determining incident objects in secondary video, in accordance with some examples.
Figure 5:
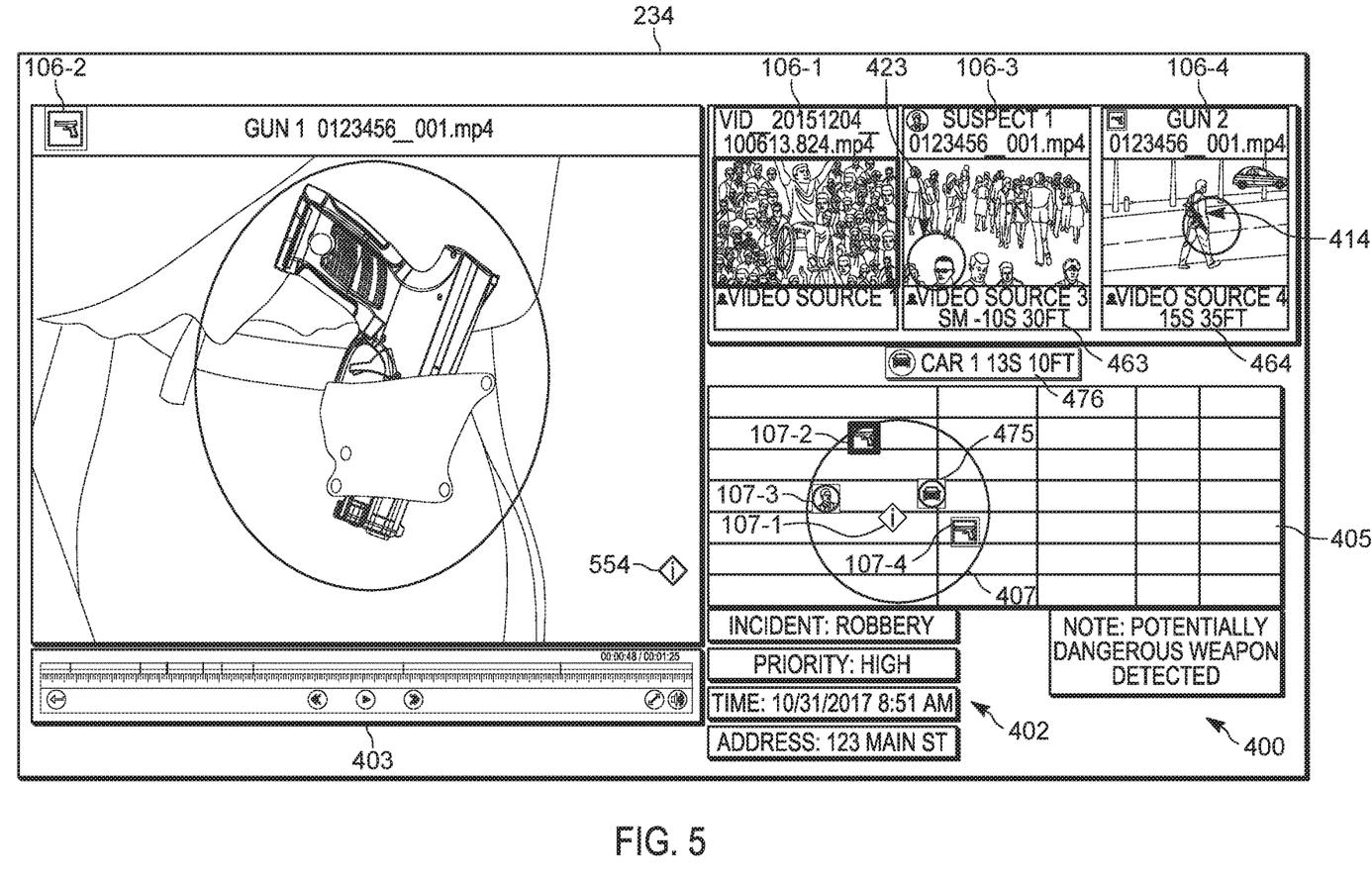
FIG. 5 depicts the graphic user interface of FIG. 4, modified to swap a primary video with a secondary video, in accordance with some examples.

Attention is next directed to FIG. 4. to FIG. 5, which depict an example of the method 300. Each of FIG. 4 to FIG. 5 depicts an example graphic user interface (GUI) 400 rendered at the display screen 234.

As depicted in FIG. 4, the GUI 400 comprises: fields 402 that include information associated with an incident that may be populated via an incident report (e.g. retrieved from a computer aided dispatch (CAD) database and the like), receipt of input at the input device 232 (e.g. via the user 104) and/or using video analytics on the videos 106.

For example, the device 101 may have received an incident report of a "Robbery" near a given address, for example "123 Main St.", that has optionally been assigned a "HIGH" priority and a time stamp "10/31/2017 1:00 pm" at which the robbery occurred. As such, the user 104 and/or the device 101 may have compared the given address with the locations 107 in the database 102 and selected a video 106 from a video source 105 that is near and/or closest to the given address. For example, the location 107-1 of the video source 105-1 may be near the given address and hence the video source 105-1 is designated as the primary video source 105-1, the video 106-1 is designated as the primary video 106-1, and the location 107-1 is designated as the primary location.

Hence, the video 106-1 is played (e.g. at the block 302 of the method 300), as depicted, in a primary position in the GUI 400 (e.g. having a larger form factor than secondary videos rendered, if at all, in the GUI 400, as described hereafter).

Playing of the primary video 106-1 may be controlled, in the GUI 400, using a video control bar 403 that may include one or more of play, forward and backwards buttons, as well as a timeline and a scrollable current playback time indicator 409 that, as set forth in FIG. 4, is currently set, by the device 101 and/or by the user 104, to 1:00 pm.

As has already been described, an incident type has been determined (e.g. at the block 304) and the incident type of a "Robbery" optionally populated at the fields 402. Hence, the device 101 may determine (e.g. at the block 306 of the method 300) incident objects associated with a robbery from the lists of incident objects 241, which may include, but is not limited to, a face of a suspect, witness, and/or other person of interest, located using names and/or images from the incident report, video analytics, social media accounts, and the like. In the present example, the device 101 may determine that guns and a given suspect are incident objects associated with the robbery.

The device 101 determines which of the videos 106 were obtained at associated locations 107 within a threshold distance of the primary location 107-1.

For example, the GUI 400 further includes a map 405 that depicts the respective locations 107-1, 107-2, 107-3, 107-4 of each of the video sources 105. As depicted on the map 405, an icon "i" (e.g. in a diamond-shaped box) is rendered at the location 107-1 to show the location 107-1 of the primary video source 105-1 (e.g. the location 107-1 at which the primary video 106-1 was captured and/or, alternatively, the location 107-1 from which the primary video 106-1 is being streamed and/or live-streamed).

Hence, a threshold distance is represented in the map 405 as a threshold distance 407 (e.g. depicted as a circle), and which, in the present example, may be 50 feet, though the threshold distance may be in any suitable units and any suitable size. Hence, as depicted, at the map 405, threshold distance 407 is depicted as a circle centered on the location 107-1 and having a radius of 50 feet (e.g. scaled to the map 405).

Hence, the controller 220 may search for particular incident objects in the secondary videos 106 acquired at locations 107 within the threshold distance 407; as depicted, each of the locations 107-2, 107-3, 107-4 are within the threshold distance 407. While not depicted, other video sources 105 located at locations outside the threshold distance 407 may also be shown on the map 405.

The controller 220 further searches for the particular incident objects in the secondary videos 106 acquired at locations 107 within the threshold distance 407, and within a threshold time period from a current playback time 409 of the primary video 106-1. For example, the current playback time 409 of the primary video 106-1 may be controlled via the video control bar 403, with the current playback time 409 of the primary video 106-1 indicated at the timeline in the video control bar 403. The threshold time period, in the present example, may be 30 seconds. Hence, the device 101 searches for incident objects associated with a robbery in the secondary videos 106-2, 106-3, 106-4 from a time period ranging from minus 30 seconds from the current playback time 409 of the primary video 106-1 to plus 30 seconds from the current playback time 409 of the primary video 106-1.

As depicted, the device 101 has detected (e.g. at the block 308 of the method 300), a gun 412, 414 in each of the videos 106-2, 106-4 (e.g. the guns 412, 414 may each comprise a particular incident object of the incident objects 241). The device 101 has further detected a suspect 423 (e.g. associated with the robbery of the video 106-1) in the video 106-3 (e.g. the suspect 423 may comprise a particular incident object of the incident objects 241). As a result of identifying incident objects in videos 106-2, 106-3, 106-4, and as depicted, the device 101 renders the secondary videos 106-2, 106-3, 106-4 in secondary positions in the GUI 400, for example that have a smaller form factor at the display screen 234 in the secondary positions, relative to the primary video 160-1 in the primary position. For example, the secondary videos 106-2, 106-3, 106-4 are rendered in a smaller format than the primary video 106-1.

As depicted, the device 101 further updates the map 405 to show icons of guns at the locations 107-2, 107-4, and an icon of a suspect at the location 107-3. Such icons provide a particular visual indicator of the incident objects detected at the locations 107-2, 107-3, 107-4.

Furthermore, the device 101 determines (e.g. at the block 310 of the method 300) a relative direction of the locations of the respective particular incident objects from the primary location 107-1. Such relative directions may be determined, for example, from positions of the locations 107 on the map 405, and the like used as proxy locations for the respective particular incident objects. However, video analytics may be used on the videos 106-2, 106-3, 106-4 to determine a more precise location of each particular incident object.

As further depicted in FIG. 4, the device 101 controls (e.g. at the block 312 of the method 300) the display screen 234 to render a particular visual indicator of each particular incident object over or adjacent the primary video 106-1 at a position indicative of the relative direction. For example, as depicted at the primary video 106-1 in FIG. 4, an icon 452 comprising a particular visual indicator of a gun is rendered at a position over the primary video 106-1 that indicates the relative direction of the gun at the location 107-2 (e.g. as detected in the secondary video 106-2). For example, comparing the location 107-2 in the map 405 with the location 107-1, the location 107-2 is about northwest of the location 107-1, and hence the icon 452 is located at the primary video 106-1 at a position that indicates the relative northwest direction. Similarly, icons 453, 454 are located at the primary video 106-1 at respective positions indicating the relative direction of the suspect in the secondary video 106-3, and the relative direction of the gun in the secondary video 106-4.

In other examples, however, the icons 452, 453, 454, and the like (e.g. particular visual indicators of each particular incident object), may be rendered on a 360 degree circle, with a respective position of the icons 452, 453, 454 on the 360 degree circle indicative of the respective relative direction with, for example, degrees of the 360 circle indicative of cardinal directions, ordinal directions, and the like (e.g. North, South, East, West), or directions relative to a direction of a field of view of the primary video 106-1. In other examples, however, other ways of indicating a relative direction of the icons 452, 453, 454 and/or visual indicators may be used; for example, a center line, and the like, of the primary video 106-1 may indicate a directions aligned with the direction of a field of view of the primary video 106-1, with the icons 452, 453, 454 and/or visual indicators arranged relative to the center line according to their relative position (e.g. over 180 degrees); for example, visual indicator may be placed vertically centered on a left side of the primary video 106-1 or vertically centered on right side of the primary video 106-1 depending on the relative position.

In some examples, as depicted, similar icons are rendered on the timeline of the video control bar 403, at times at which the corresponding respective incident objects were detected. Hence, the locations of the icons on the timeline of the video control bar 403 indicate a time at which the associated particular incident objects appear in the respective secondary videos 106-2, 106-3, 106-4.

Furthermore, in the GUI 400, as the primary video 106-1 is played, the device 101 may track movement of particular incident objects (e.g. the guns 412, 414 and the suspect 423), in the secondary videos 106-2, 106-3, 106-4 as a function of time of the secondary videos 106-2, 106-3, 106-4, synchronized with the playing of the primary video 106-2, and the positions of the particular visual indicators (e.g. the icons 452, 453, 454) corresponding to the particular incident objects may be modified in the primary video 106-1 with the movement of the particular incident object in the secondary video 106-2. For example, the icons 452, 453, 454 may move at the primary video 106-1 as the relative directions of the corresponding particular incident objects move in each of the secondary videos 106 (tracked, for example, using video analytics).

Similarly, the device 101 may: determine, at a time synchronized with the playing of the primary video 106-1, that a particular incident object no longer appears in a secondary video 106; and responsively remove the corresponding particular visual indicator/icon from over or adjacent the primary video 106-1. Hence, for example, one or more of the icons 452, 453, 454 may be removed at the primary video 106-1 when the corresponding particular incident object no longer appears in a secondary video 106 at time corresponding to a current playback time of the primary video 106-1.

As also depicted in FIG. 4, each of the secondary videos 106-2, 106-3, 106-4 are rendered in the secondary positions in the GUI 400 at a playback time at which a particular incident object was found.

As also depicted in FIG. 4, each of the secondary videos 106-2, 106-3, 106-4 are rendered with a respective indication 462, 463, 464 of a relative time (e.g. relative to the current playback time 409 of the primary video 106-1) at which a respective particular incident object was first detected in each of the secondary videos 106-2, 106-3, 106-4. As depicted, each respective indications 462, 463, 464 may further indicate a distance from the location 107-1 at a respective particular incident object was detected in each of the secondary videos 106-2, 106-3, 106-4.

For example, the indication 462 indicates "0 s 30 ft", which indicates that the gun 412 in the secondary video 106-2 was first detected at a time corresponding to the current playback time 409 of the primary video 106-1 at a distance of 30 feet from the location 107-1. Similarly, the indication 463 indicates "−10 s 30 ft", which indicates that the suspect 423 in the secondary video 106-3 was first detected 10 seconds prior to the current playback time 409 of the primary video 106-1 at a distance of 30 feet from the location 107-1. Similarly, the indication 464 indicates "+15 s 35 ft", which indicates that the gun 414 in the secondary video 106-4 was first detected 15 seconds after the current playback time 409 of the primary video 106-1 at a distance of 35 feet from the location 107-1. In some examples, each of the distances in the indications 462, 463, 464 may further include a relative direction from the location 107-1. In yet further examples, each of the times in the indications 462, 463, 464 may further show an absolute time (e.g. a time of day with date, and the like), at which each particular incident object appears in a respective secondary video 106-2, 106-3, 106-4.

In some examples, as depicted, each of the icons 452, 453, 454 are also rendered with respective indications similar to the indications 462, 463, 464.

As depicted adjacent the indication 463, in some examples the device 101 may further indicate that the suspect 423 was identified with the assistance of social media; for example, a name of the suspect 423 may have been received in an incident report and the device 101 may have retrieved an image of the suspect 423 from a social media account associated with the name of the suspect 423. The image of the suspect 423 may have been compared with the secondary videos 106 to detect the suspect 423 therein. Hence, as depicted in FIG. 4, the phrase "SM" adjacent the secondary video 160-3 indicating that the suspect 423 was detected in the secondary video 160-3 using a social media ("SM") account. In some examples, the phrase "SM" may include a name of the social media platform where the image of the suspect 423 was found and/or a link (e.g. a hypertext link) to the social media account where the image of the suspect 423 was found.

In some examples, the particular incident objects detected in the secondary videos 106-2, 106-3, 106-4 (and/or other secondary videos), may be assigned a priority, and the device 101 may render secondary videos 106-2, 106-3, 106-4, and associated particular visual indicators (e.g. the icons 452, 453, 454) at the primary video 106-1 only for particular incident objects that are above a threshold priority; in some examples, the device 101 may only render associated particular visual indicators for a threshold number of the highest priority incident objects (e.g. such a threshold number of the highest priority incident objects may be 2, 3, 5, or 10 and/or any suitable threshold number). For example, the guns 412, 414 and the suspect 423 may be assigned a highest priority level (e.g. above a threshold priority), and hence, secondary videos 106-2, 106-3, 106-4, and associated particular visual indicators (e.g. the icons 452, 453, 454) are rendered. However, FIG. 4 also depicts, at the map 405, an icon of a vehicle detected at a location 475 (e.g. in one of the secondary videos 106 from a video source 105 at the location 475), which may also be in the list of incident objects 241. However, vehicles may be assigned a lower priority (e.g. below a threshold priority) and hence the secondary video 106 in which the vehicle is detected is not rendered at the display screen 234, nor is a particular visual indicator of the vehicle provided over or adjacent to the primary video 106-1. Nonetheless, in some examples, as depicted, an indicator 476 of the vehicle at the location 475 may be provided that identifies the vehicle (e.g. "Car 1"), and a relative time and relative distance from the primary location 106-1.

Also depicted in FIG. 4 is a selection of the icon 452, as indicated by the box around the icon 452. The icon 452 may be selected by the user 104 touching a touchscreen of the display screen 234 and/or by the user 104 using a mouse, and the like, to move a pointer to "click" on the icon 452 and/or by the user using a mouse, and the like, select the icon 452 from a drop-down menu, and the like. When the icon 452 is selected, the corresponding location 107-2 may be highlighted on the map 405 (e.g. as depicted, the gun icon at the location 107-2 has a box drawn around it, to highlight the location 107-2); similarly, when the icon 452 is selected, the corresponding secondary video 106-2 is highlighted (e.g. as depicted, the corresponding secondary video 106-2 has a box drawn around it to distinguish it from the other secondary videos 106-3, 106-4). As depicted, the corresponding icon on the timeline of the video control bar 403 is also highlighted via a box drawn around it.

In some examples, when the icon 452 is selected and/or activated, the positions of the videos 106-1, 106-2 may be swapped at the GUI 400. some examples, when the icon 452 is selected and/or activated, the positions of the videos 106-1, 106-2 may be swapped at the GUI 400. A selection of the icon 452 that results in the videos 106-1, 106-2 being swapped may be different from a selection of the icon 452 that results in highlighting of corresponding location 107-2 and/or the corresponding secondary video 106-2 and/or the corresponding icon on the timeline of the video control bar 403. For example, the different selections may occur using different inputs (e.g. a short press for highlighting and a long press for swapping, and/or a single click for highlighting and a double click for swapping, and/or selecting different menu items from a drop-down menu, and the like).

Regardless, the icon 452 may comprise a link and/or a hotlink to the corresponding secondary video 106-2 to enhance searching for evidence of the incident (e.g. the robbery) associated with the primary video 106-1. Similarly, the icons 453, 454 comprise respective links to the corresponding secondary videos 106-3, 106-4.

To illustrate such links, attention is next directed to FIG. 5, which is substantially similar to FIG. 4, with like elements having like numbers. However, as depicted in FIG. 5, the GUI 400 is updated responsive to detecting an input activation of the particular visual indicator and/or icon 452. As such, in FIG. 5, the primary video 106-1 at the display screen 234 has been replaced in the primary position with the secondary video 106-2, at a second playback time substantially synchronized with the current playback time 409 of the primary video 106-2 at which the input activation of the particular visual indicator was received. For example, if the current playback time 409 is 1:00 pm on a given date, then the secondary video 106-2 (e.g. in the primary position of the primary video 106-1 in FIG. 4) is rendered at the same playback time of 1:00 pm on the same given date.

Furthermore, in FIG. 5, the primary video 106-1 is now being rendered in the same secondary position at which the secondary video 106-2 was rendered in FIG. 4.

As also depicted in FIG. 5, the device 101 is controlling the display screen 234 to render a particular visual indicator 554 over or adjacent the secondary video 106-2 at a respective position indicative of the primary location 107-1 of the primary video source 105-1 relative to the secondary location 107-2, similar to as described above with respect to the icons 452, 453, 454. As depicted, the particular visual indicator 554 is similar to the icon "i" rendered at the location 107-1 on the map 405 to show the location 107-1 of the primary video source 105-1. In other examples, a back button or back arrow could be used as well.

The particular visual indicator 554 may be used to again swap the positions of the primary video 106-1 and the secondary video 106-2. Hence, the particular visual indicator 554 may comprise a link back to the primary video 106-1. For example, the device 101 may, responsive to detecting a respective input activation of the second particular visual indicator 554, replace the secondary video 106-2 at the display screen 234 with the primary video 106-1, at a third respective playback time substantially synchronized with the second playback time of the secondary video 106-2 at which the respective input activation was received. For example, in FIG. 5, the secondary video 106-2 may be played and/or controlled to a given play playback time and, when the particular visual indicator 554 is activated, the primary video 106-1 is again rendered in the primary position in the GUI 400, but at a playback time corresponding to the playback time of the secondary video 106-2.

Hence, provided herein is a device, system and method for determining incident objects in secondary video. For example when an incident associated with a primary video is determined, devices and systems described herein may automatically search for related particular incident objects in secondary videos according to a threshold distance and a threshold time period, for example to search for evidence of the incident in the secondary videos. Particular visual indicators of detected incident objects in the secondary videos are provided at the primary video to assist in identifying incident objects and videos associated with the incident. Such devices, systems, and methods of the present specification may reduce the use of input devices and processing resources used to search for evidence in the secondary videos.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   playing, using a controller of an electronic device, at a display screen, a primary video from a primary video source located at a primary location;
   determining, using the controller, an incident type associated with the primary video;
   determining, using the controller, one or more incident objects associated with the incident type;
   detecting, using the controller, a particular incident object, of the one or more incident objects, in a secondary video from a secondary video source located at a secondary location within a threshold distance of the primary location, the particular incident object appearing in the secondary video within a threshold time period from a current playback time of the primary video;
   determining, using the controller, a relative direction of a location of the particular incident object from the primary location;
   controlling, using the controller, the display screen to render a particular visual indicator of the particular incident object over or adjacent the primary video at a position indicative of the relative direction; and
   while playing the primary video at the display screen, one or more of:
      tracking movement of the particular incident object in the secondary video as a function of time of the secondary video synchronized with the playing of the primary video; and modifying the position of the particular visual indicator in the primary video with the movement of the particular incident object in the secondary video; and
      determining, at a time synchronized with the playing of the primary video, that the particular incident object no longer appears in the secondary video; and responsively removing the particular visual indicator from over or adjacent the primary video.

2. The method of claim 1, further comprising:
responsive to detecting an input activation of the particular visual indicator, replacing the primary video at the display screen with the secondary video, at a second playback time substantially synchronized with the current playback time of the primary video at which the input activation was received.

3. The method of claim 2, further comprising:
controlling, using the controller, the display screen to render a second particular visual indicator over or adjacent the secondary video at a respective position indicative of the primary location of the primary video source relative to the secondary location.

4. The method of claim 3, further comprising:
responsive to detecting a respective input activation of the second particular visual indicator, replacing the secondary video at the display screen with the primary video, at a third respective playback time substantially synchronized with the second playback time of the secondary video at which the respective input activation was received.

5. The method of claim 1, wherein the particular incident object never appears in the primary video.

6. The method of claim 1, wherein the secondary video is not being rendered at the display screen.

7. The method of claim 1, further comprising:
controlling, using the controller, the display screen to render the primary video in a primary position; and
controlling, using the controller, the display screen to render the secondary video in a secondary position, the secondary video having a smaller form factor at the display screen in the secondary position, relative to the primary video in the primary position.

8. The method of claim 7, further comprising:
controlling, using the controller, the display screen to render the secondary video time-synchronized with the primary video.

9. The method of claim 1, wherein determining the incident type associated with the primary video comprises one or more of:
applying video analytics to the primary video;
applying one or more machine learning algorithms to the primary video
receiving input from an input device in communication with the controller; and
retrieving the incident type from a computer-aided-dispatch record associated with one or more a user of the electronic device and the primary video.

10. An electronic device comprising:
a controller in communication with a display screen, the controller configured to:
play, at the display screen, a primary video from a primary video source located at a primary location;
determine an incident type associated with the primary video;
determine one or more incident objects associated with the incident type;
detect a particular incident object, of the one or more incident objects, in a secondary video from a secondary video source located at a secondary location within a threshold distance of the primary location, the particular incident object appearing in the secondary video within a threshold time period from a current playback time of the primary video;
determine a relative direction of a location of the particular incident object from the primary location;
control the display screen to render a particular visual indicator of the particular incident object over or adjacent the primary video at a position indicative of the relative direction; and
while playing the primary video at the display screen, one or more of:
track movement of the particular incident object in the secondary video as a function of time of the secondary video synchronized with the playing of the primary video; and modify the position of the particular visual indicator in the primary video with the movement of the particular incident object in the secondary video; and
determine, at a time synchronized with the playing of the primary video, that the particular incident object no longer appears in the secondary video; and responsively remove the particular visual indicator from over or adjacent the primary video.

11. The electronic device of claim 10, wherein the controller is further configured to:
responsive to detecting an input activation of the particular visual indicator, replace the primary video at the display screen with the secondary video, at a second playback time substantially synchronized with the current playback time of the primary video at which the input activation was received.

12. The electronic device of claim 11, wherein the controller is further configured to:
control the display screen to render a second particular visual indicator over or adjacent the secondary video at a respective position indicative of the primary location of the primary video source relative to the secondary location.

13. The electronic device of claim 12, wherein the controller is further configured to:
responsive to detecting a respective input activation of the second particular visual indicator, replace the secondary video at the display screen with the primary video, at a third respective playback time substantially synchronized with the second playback time of the secondary video at which the respective input activation was received.

14. The electronic device of claim 10, wherein the controller is further configured to: control the display screen to render the primary video in a primary position, and control the display screen to render the secondary video in a secondary position, the secondary video having a smaller form factor at the display screen in the secondary position, relative to the primary video in the primary position.

15. The electronic device of claim 14, wherein the controller is further configured to render the secondary video at the display screen time-synchronized with the primary video.

16. The electronic device of claim 10, wherein the controller is further configured to determine the incident type associated with the primary video by one or more of:
applying video analytics to the primary video;
applying one or more machine learning algorithms to the primary video
receiving input from an input device in communication with the controller; and
retrieving the incident type from a computer-aided-dispatch record associated with one or more a user of the electronic device and the primary video.

* * * * *